United States Patent [19]

Erickson et al.

[11] 4,146,927
[45] Mar. 27, 1979

[54] ELECTRONIC SURVEYING SYSTEM

[75] Inventors: Kent E. Erickson, Brookside; Stefan Orsen, Jersey City; Gerhardt C. Rowe, Flemington, all of N.J.

[73] Assignee: Keuffel & Esser Company, Morristown, N.J.

[21] Appl. No.: 810,241

[22] Filed: Jun. 27, 1977

[51] Int. Cl.² ............................................. G01B 11/26
[52] U.S. Cl. .......................................... 364/560; 356/5
[58] Field of Search .................. 364/560, 561–562; 356/3, 5, 138, 147, 253, 169

[56] References Cited

U.S. PATENT DOCUMENTS

| 3,619,058 | 11/1971 | Hewiett et al. | 356/5 |
| 3,652,161 | 3/1972 | Ross | 356/5 |
| 3,680,958 | 8/1972 | Bose | 356/5 X |
| 3,778,159 | 12/1973 | Hines et al. | 356/5 |

*Primary Examiner*—Edward J. Wise

*Attorney, Agent, or Firm*—Lionel N. White

[57] ABSTRACT

The surveying system comprises a theodolite which provides digital data from electro-optical horizontal and vertical circle reading components and includes a level sensor which generates digital data relative to the attitude of the vertical axis of the instrument. Additional means are included for presetting instrument correction and scaling factors which together with angle and level data are processed by an on-board microcomputer to yield accurate digital displays of horizontal and vertical angles. Provision is also made for the input of digital slope range data from an electronic distance measuring instrument to be displayed directly or processed with horizontal and vertical angle data by the microcomputer to provide vector coordinates of the observed target. In response to operator selection from parameter and vector functions the control program cycles the processing of relevant data in order to provide a repeatedly updated display of any desired function.

4 Claims, 6 Drawing Figures

ELECTRONIC SURVEYING SYSTEM

BACKGROUND

The present invention relates to geodetic surveying, particularly a system of instrumentation which can assist the surveyor by providing automatic calculation and direct readout of the various parameters and vectors encountered during the course of a survey.

The transit and tape have in great measure been supplanted as basic tools of the surveyor by digital display instruments, such as the angle encoder theodolite described in U.S. Pat. No. 3,768,911 and the electronic distance measuring device described in U.S. Pat. No. 3,778,159. While these newer instruments represent a marked improvement in convenience and accuracy, they nonetheless merely provide the same raw data, i.e. horizontal angle, vertical angle, and range, which the surveyor previously acquired by means of the classic devices. As a result, there remains the matter of translating these data into their more useful component vectors, i.e. horizontal distance, latitude, departure, and elevation.

Some attempts have been made to derive these vectors directly in the measuring instrument, for example by means of an analog approach as described in U.S. Pat. No. 3,677,646; however, few have proven successful. The advent of small electronic calculator elements later made possible the generation of some vector values at the surveyor's station, as described in U.S. Pat. No. 3,895,871, but such practices required the manipulation of data by the operator and were thus basically lacking in automatic function capabilities. Calculators were also employed to derive some vectors from specially prescribed distance measuring procedures, as in U.S. Pat. No. 3,900,260, yet the utility of such schemes was particularly limited.

SUMMARY

The surveying system of the present invention comprises a digital surveying instrument which is arranged to interface with primary peripherals comprising an electronic distance measuring (EDM) instrument and an alphanumeric keyboard. Other peripherals, such as a tape recorder or recording computer, may likewise be interfaced with the surveying instrument to thereby expand the capabilities of the system.

As the mainstay of the system, the digital surveying instrument in some respects functions much in the manner of the conventional optical surveying theodolite, comprising an alidade which includes horizontal and vertical circles along with the sighting telescope common to such instruments. Unlike the optical theodolite, however, the surveying instrument of the present invention comprises encoded circle and photoelectric circle-reading components, such as described in U.S. Pat. No. 3,768,911, which generate digital data representative of movement in the theodolite alidade about the vertical and horizontal axes.

Incorporated in the body of the surveying instrument is a level sensor which provides a digital data indication of the disposition of the vertical axis of the surveying instrument with respect to gravity in the plane of the line of sight of the telescope. Manually settable correction and scaling switches are included in the structure and provide a means of final adjustment of the level sensor to establish a precise vertical datum for the instrument.

The body of the surveying instrument alidade also houses the components of a microcomputer which is programmed to carry out the translation of the various data generated in the system into a useful digital format which may be presented at the display panel of the unit. Functioning of the system is substantially automatic under the control of the program of the computer which in operation continually processes the data generated in the relevant input components of the system combination to provide a readout display of the value of that function specifically selected by the surveyor. Thus, for example, the horizontal angle (H) function value will continue to be updated and displayed on the panel of the instrument while the operator turns an angle.

The surveying instrument is provided further with an input port to receive range data directly from an EDM instrument, such as described in U.S. Pat. No. 3,778,159. This digital data may be processed in the computer and presented in the form of slope range (R), if so selected by the operator, or the data may be utilized in the programmed computations in combination with horizontal or vertical angle data for the derivation of horizontal distance (D), departure (X), latitude (Y), or difference in elevation (Z) as these vectors are called for by the operator through appropriate placement of a function selector switch.

An input port is also provided for the interfacing of an alphanumeric keyboard by means of which the operator may call for various operations in the program of the microcomputer. The keyboard also serves to preset any of the vector or parameter values, e.g. slope range data in the event that an interfaceable EDM instrument is not available.

Thus, the digital surveying instrument with its incorporated microcomputer, and peripheral EDM instrument and alphanumeric keyboard can be utilized by the surveyor in the field as a system which, when employed in common surveying procedures, can automatically measure slope range, horizontal distance, departure, latitude, and elevation. These ultimate data may be recorded on additional peripheral equipment during the course of a surveying project for later processing or translation into other formats, such as real world coordinates, or incorporation into large scale data banks.

DRAWINGS

DESCRIPTION

Figure 1:
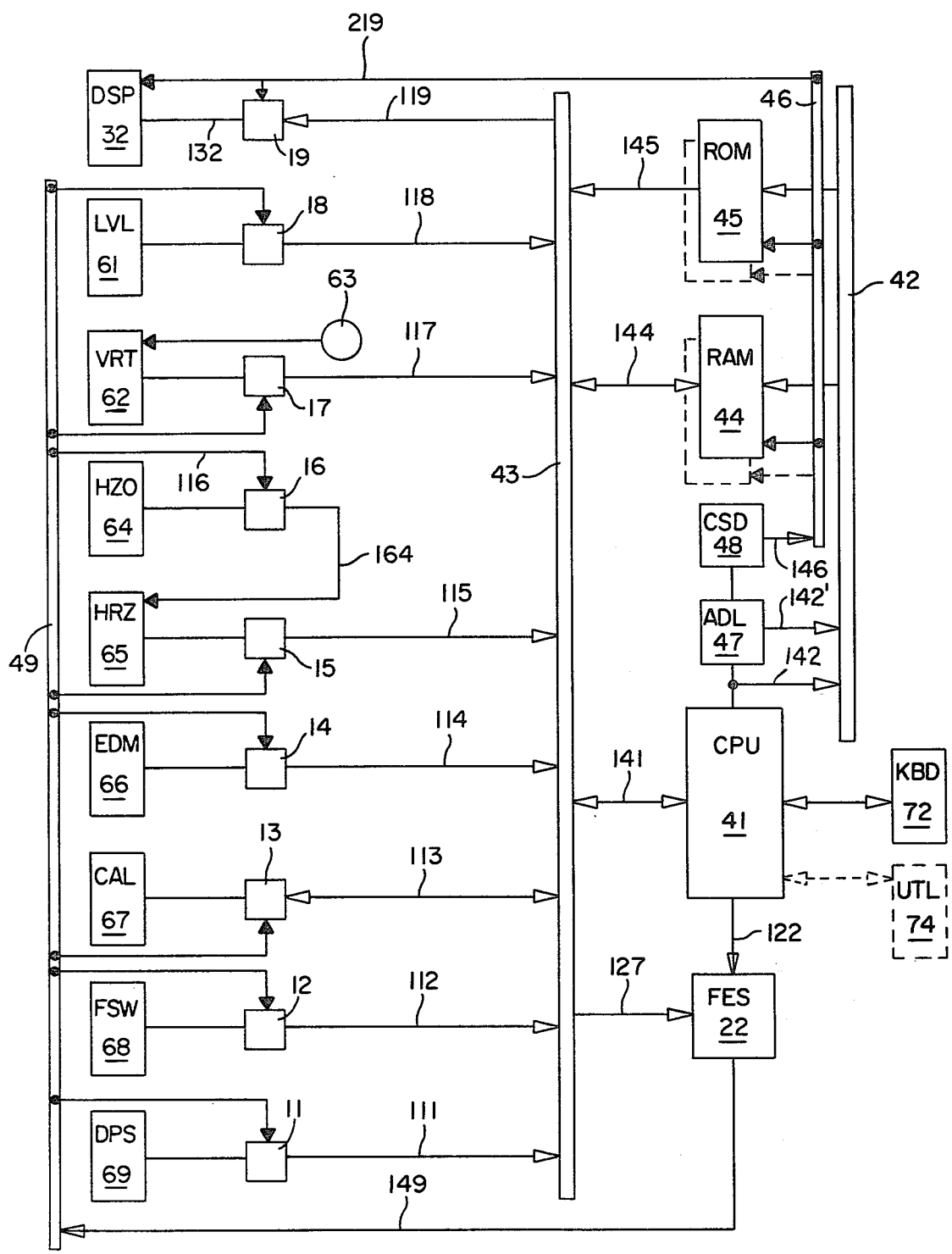
FIG. 1 is a schematic representation of an embodiment of the electronic surveying system of the present invention.

The present system may be readily seen in FIG. 1 of the drawings which schematically depicts the various elements of the system and the manner of their operational interrelation.

The basic data-generating input components of the surveying system are the surveying instrument's electro-optical vertical angle and horizontal angle measuring assemblies of which the respective digital counters (VRT) 62 and (HRZ) 65 are shown, and the electronic distance measuring instrument (EDM) 66. Additional data input devices comprise level sensor (LVL) 61, calculator chip (CAL) 67, and presettable scaling and correction DIP switches sets, represented collectively at DPS 69, by which final adjustment may be made in leveling and zero indexing functions at the time of instrument assembly. Also included are vertical zero index 63 and horizontal angle zeroing function (HZO) 64.

Operation of the system in its automatic data gathering and processing cycles, as shown in FIG. 4, is under the control of a central processing unit (CPU) 41 which communicates with the various noted elements of the system by way of data bus 43. CPU 41 communicates also with random access (read-write) memories (RAM) 44 and read-only memories (ROM) 45 by way of address bus 42. In the memory address loop there are included address latch (ADL) 47 and chip select decoder (CSD) 48 which enable CPU 41 to communicate with any one or more selected RAM or ROM elements 44, 45.

In the course of system operation CPU 41 communicates also with function enable selector (FES) 22 by means of which any of the previously noted data input components and devices may be instructed to deliver real-time data to CPU 41 for appropriate programmed processing. Upon indication by the operator, by means of function switch (FSW) 68, the system will determine and present in digital form at display (DSP) 32 any one of the measured parameters or calculated vectors which the operator may desire. Direct communication between the operator and CPU 41 may also be effected by means of a keyboard (KBD) 72 which may incorporate a storage memory and digital display for two-way communication. Other external utilization elements or devices (UTL) 74 may be interfaced with the system through CPU 41 to provide additional communication, recording, and computing capabilities.

In general operation the surveying system follows the directions of CPU 41, as prescribed by the program contained in ROMs 45, to gather and develop data relating to each of the parameter and vector functions for display presentation as requested by the operator. Unless interrupted in its operation by overiding input from external instrumentation such as keyboard 72, the program will repeatedly interrogate function switch 68 to determine the parameter or vector desired by the operator and when thus instructed will proceed to gather and appropriately process the required data for value presentation at the display panel.

Each of the data-generating devices of the system, i.e. level sensor 66, vertical angle counter 62, horizontal angle counter 65, and EDM 66 operate independently of the microcomputer and hold real-time data available for access by CPU 41 whenever the program determines that such data are needed to develop the respective function values. The data from each of such operational devices are separately presented to data bus 43 of the microcomputer through high-impedance three-state logic elements, such as gates 11–18, which are individually enabled for the delivery of such data by function enable selector 22. Range data, for example, independently processed in EDM 66, is continually updated and presented at gate 14, but is not accessible to CPU 41 until gate 14 is enabled for delivery of such data by way of bus 43. Enablement of each such data access gate is effected under program operation in response to the regular periodic interrogation of function switch 68, the access to which is itself controlled by programmed instruction delivered to selector 22.

By way of illustration of operations effected by the system of the present invention, one might consider the following activities encountered in the course of turning an angle in a typical surveying procedure. Having occupied a designated station, the surveyor will backsight to the previous station in the traverse and initialize the instrument by placing the indicator of function switch 68 on H, thus selecting horizontal angle as the parameter to be displayed, and depressing a panel-mounted button which actuates the horizontal angle zeroing function 64. As instructed by the program in ROMs 45, CPU 41 will direct function enable selector 22 to enable gate 12 and allow binary data indicative of function switch position to proceed along bus lines 112 to bus 43 for assimilation by CPU 41 with responsive generation of further instructions in accordance with appropriate program steps. The indication of the selection of horizontal angle function by switch 68 directs the program to instruct CPU 41 to have selector 22 enable gate 16, by way of harness lines 149, 49 and conductor 116 to access the condition data at HZO 64 along conductor 164 to reset the horizontal angle counter 65 to zero. The instructions from the program then operate in similar manner, through function enable selector 22, to open gate 15 and access the data in reset HRZ 65 along bus lines 115 to bus 43 from which the data is taken by CPU 41 and stored in the operational memory of RAMs 44.

The zero angle reading data is then delivered via bus 43 and bus lines 119 to gate 19 which is opened according to the addressing of CPU 41 through address latch 47 and chip select decoder 48 thence by way of harness lines 146, 46 and 219. The reset angle data then proceeds along bus lines 132 to display means 32 which will be described in greater detail below. There is then indicated on the display panel of the surveying instrument the value of 000.000 grads.

The particular unit of angle to which the numerical display relates is a function of a preset factor which is field adjustable by the operator by means of a selector switch (not shown) located within the body of the theodolite instrument. By way of preference in an embodiment of the surveying instrument of the present system, the physical division of the vertical and horizontal circles is based on the grad unit of angle measurement and, therefore, the count data generated by angular displacement in the theodolite alidade must be processed according to a conversion factor in order to obtain any desired units of angle measurement other than grads, for example decimal degrees, mils, or degrees-minutes-seconds. Such scaling is effected by means of the programmed accessing of data from counter 65 via CPU 41 to calculator element 67 by way of bus lines 113 and enabled gate 13 with return of the corrected values along the same route for temporary storage in RAMs 44 and subsequent display at means 32.

The surveyor proceeds now to turn the prescribed angle while watching the display panel of the theodolite instrument. As the angle is turned the display is updated at approximately 0.5 second intervals to present the current extent of angle increase from the backsighted zero position. During that time interval between display updating, the program, as represented in the first loop of the flow diagram shown in FIG. 4a, directs the previously noted sequencing of interrogation of function switch 68 to confirm the desired presentation of horizontal angle, interrogation of zeroing function 64 to confirm continued accumulation of angle, gathering of horizontal angle data from counter 65, processing angle data to proper scale units in calculator 67, and presentation of accumulated horizontal angle value in appropriate units at display 32. The sequence is continually repeated at the noted rate until an interrogation of function switch 68 indicates the operator's desire for the display of some other measured parameter or calculated vector.

By means of additional instructions presented by the operator to CPU 41, for example through keyboard 72, the system may be caused to hold a previous reading of horizontal angle while the instrument is again backsighted to the previous station. By then repeating the angle-turning procedure, the surveyor may obtain an accumulation of turned angles with intermittent computation and display of the average angle turned and the mean deviation of each turned angle from the running average. In this manner the accuracy of the surveying process is substantially increased without risk of scale reading error or involvement in extensive manual recording and computation.

Operation of the system in the determination of other measured parameters of vertical angle, or slope range and the computations of the previously noted vectors generally follows the same scheme of data gathering and processing with, of course, appropriate accessing of relevant data generating and processing elements. Such operations are shown in the respective program loops of the flow diagram depicted in FIG. 4 and will be described further in discussions of a preferred embodiment of the present invention.

PREFERRED EMBODIMENT

In the embodiment of the present invention generally shown in FIG. 1, CPU 41 is a CDP1802, COSMAC Microprocessor, a one-chip CMOS 8-bit register-oriented central processing unit, marketed by RCA Corporation. The structure, organization, and operation of this microprocessing unit is fully described and discussed in the User Manual MPM-201A, published by RCA in 1976 and, therefore, will not be discussed in extensive detail in the present description. RAMs 44 are two RCA CDP1822 (256 × 4) static devices, and ROMs 45 comprise three Intel 2716 (2K × 8) EPROM chips.

The two-byte memory address system characteristic of the CDP1802 microprocessor is utilized and for this reason ADL 47 is employed to latch the desired bits of the high-order byte for transfer over line 142' to address bus 42 while the low-order byte is transferred to the bus over line 142. Prescribed ones of the latched high-order bits are utilized as input to BCD-to-decimal chip select decoder 48 which serves to activate desired ones of the various RAM and ROM chip elements or display means 32 and gate 19. Device selection signals are transmitted by way of harness lines 146, 46 to the designated element.

As earlier noted, the operational program for the system is contained in ROMs 45 in the usual manner in order to avoid loss of program instructions during periods of power shutdown. RAMs 44 provides extra "scratch pad" capacity for CPU 41 and are utilized to temporarily retain accumulated data and calculations during the course of the various program routines.

Figure 2:
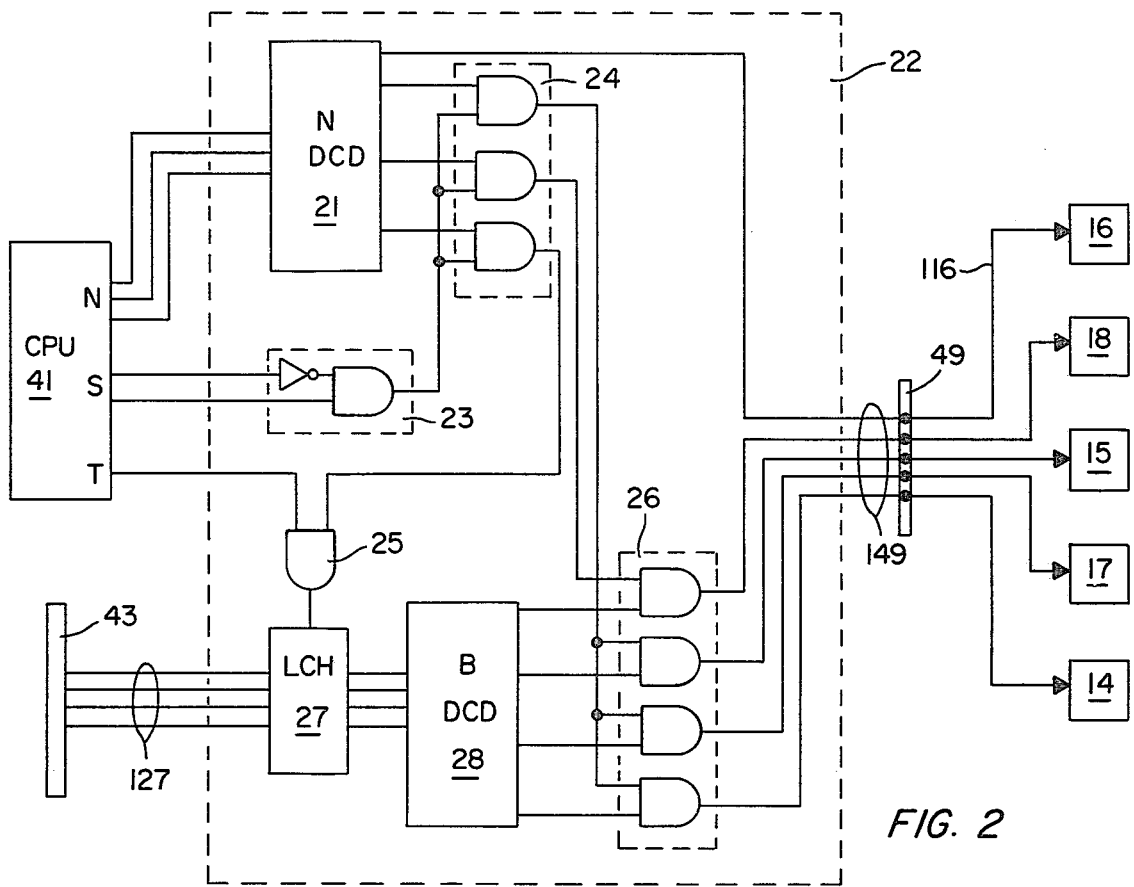
FIG. 2 is a schematic representation of the function enable selector component of the embodiment of FIG. 1.

Implementation of the operational program in the selection of relevant ones of the data gathering and computation elements in the system is effected through the use of function enable selector 22 which may be seen in greater detail in FIG. 2. There are utilized for this purpose various of the control signals generated by CPU 41, namely, the three-bit N code, the two-bit state code and one of the two timing lines, all shown collectively as harness line 122 in FIG. 1. The program-generated N code signal is decoded at N-DCD 21 to derive a number of separate line signals of which three are shown as input to AND gates 24 with a fourth being shown, by way of example, as directly effecting enablement of access gate 16. The two-bit state code is decoded in logic element 23 to yield an active signal only when CPU 41 is in an EXECUTE state. This decoded signal is utilized as a second input to AND gates 24. It should be noted here that all of the full complement of eight decoded output lines from N decoder 21 may be utilized with a like number of AND gates, or directly, depending upon the number of functional elements which are to be enabled upon command of the involved program.

Also utilized as instructional input to selecter 22 are data bus lines 127. One timing signal generated in CPU 41 and output at T is utilized in AND gate 25 with the output of an AND gate 24 to actuate latch 27 for input of the four-bit data bus signal to BCD-to-decimal bus decoder (B-DCD) 28. An appropriate number of signals from decoder 28, four such signals being shown by way of illustration, are combined in AND gates 26 with selected ones of signals from AND gates 24 to provide distinguishing combinations of N code, state code, and bus data (N·S·B) to be used as actuating signals along harness lines 149 and harness 49 to enable any desired one of the systems bus access gates shown in FIG. 2 by representative gates 14–18.

In this manner function enable selector 22 may be arranged to provide any desired number of different individual enabling signals to be carried in harness 49 for effecting the communication of all data sources, including correction and scaling DIP switches, in the system with the operational components of the microcomputer. Various combinations of decoded signals are thus selected to establish the desired synchronization in the enablement of these functioning elements within the system.

Figure 3:
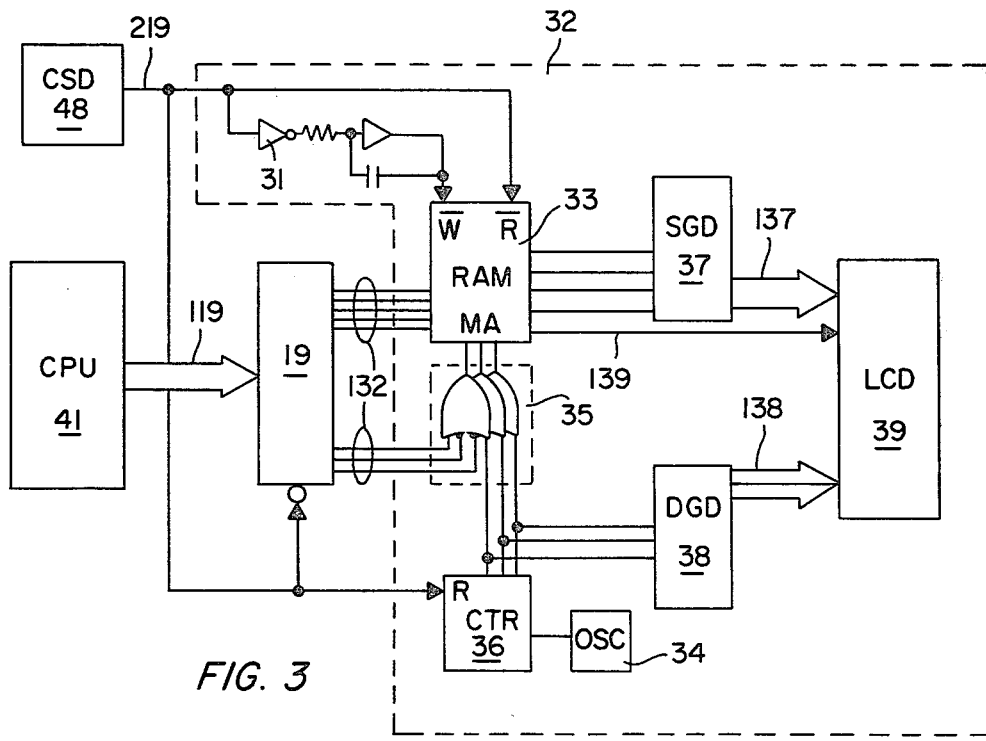
FIG. 3 is a schematic representation of the display component of the embodiment of FIG. 1.

As each routine for the derivation of the digital values of selected parameters or vectors is completed, such values are sent by CPU 41 along bus 43 and bus lines 119 to access gate 19 for utilization and presentation by display means 32, shown in detail in FIG. 3. As each updated value of the desired function is placed on bus 43 by CPU 41, an appropriate address signal is decoded in chip select decoder 48 to enable access gate 19 by way of harness 46 and line 219 and allow delivery of each eight-bit data signal to display means 32 on bus lines 119 and 132. Upon receipt of all digits in the function value, display means 32 cycles the digit values through the display until that value is updated at the next program cycle. Such display recycling in the system enables CPU 41 to become involved in other operations without interrupting the display, thus ensuring more efficient use of the microcomputer while avoiding annoying flicker in the value display.

Display means 32, shown in detail in FIG. 3, acquires input data from CPU 41 along data bus lines 119 which are accessed by gate means 19. The enablement of gate 19 is effected by the appropriate program signal address which is decoded in chip select decoder 48 and conducted to access gate 19 from harness 46 and line 219. In addition to enabling gate 19 as an inverted input, the signal over line 219 is conducted directly to display means 32 to serve as a read/write instruction signal for RAM 33, an RCA CDP 1824 static memory device (32 × 8), and a reset signal for binary counter 36.

As each of the digits of a function value is presented at bus lines 119, a "hi" signal is provided by CSD 48 over line 219 to simultaneously reset binary counter 36 to zero, enable gate 19 in the form of a logic "lo", and after a slight delay through invertor 31, place RAM 33 in a write mode. Each input data byte presented at gate means 19 is in eight bits, of which five comprise the BCD encoded value digit and a decimal point designator, while the three remaining bits represent encoded memory address locations. These bits of digit data proceed along bus lines 132 to RAM 33, the memory address bits being conducted through OR gates 35, where the encoded value is recorded at the designated address. In like manner each additional digit is written into RAM 33 at its appropriate address location for later recall and presentation at the display panel. When the program has completed the writing of all digits of the current parameter or vector function value into RAM 33, the signal from CSD 48 over line 219 goes to its normal "lo" condition to simultaneously disable gate means 19, enable counter 36, and place RAM 33 in a read mode.

Communicating with binary counter 36 is a free-running oscillator 34, having a frequency of about 500 Hz. When counter 36 is in an enabled mode, the outputs of successive stages of the counter duplicate, and by means of OR gates 35 are substituted for, the series of binary address bytes originally utilized during the period of writing data into RAM 33. These address bytes continue to repeatedly address RAM 33, now in its read mode, and thus the function value digits are repeatedly read out of RAM 33 in the same sequence in which originally written. After processing in BCD-to-seven-segment decoder (SGD) 37 these value digit signals are conducted to eight-digit display 39 over lines 137 and digit line 139.

Concurrently with the addressing of RAM 33 during the read mode sequence, the circulating binary digit output of counter 36 is also directed to binary-to-octal digit decoder (DGD) 38 from which the output is conducted over lines 138 to enable in sequence each of the eight digits in display panel 39.

Display means 32 thus provides for the continuous display of a current value of any parameter or vector selected by the operator without requiring the service of the CPU and the computer program except during the approximately 0.1ms update data input period which occurs every 0.5 to 1.0 second. The resulting economy of processing time is apparent.

Operation of the present system in providing the surveyor with a display of other parameter or vector values follows the appropriate program routine in the manner generally set out above with respect to a value of horizontal angle. Derivation and implementation of a particular program is fully within the capabilities of the skilled programmer and will, of course, depend upon the organization and operation of the particular processor and peripheral elements employed. Various of the other value-generating routines in the present system may be commented on here as a means of further illustrating this embodiment of the invention.

EDM 66 (FIG. 1) employed in the preferred system is a phase comparison measuring device based on a solid-state IR light-emiting diode source operating in the manner described in U.S. Pat. 3,778,159, and is one which is marketed under the trademark, AUTO-RANGER, by Keuffel & Esser Company, Morristown, N.J. The EDM instrument is normally physically mounted atop the standards of the theodolite alidade of the present surveying instrument and measures the line-of-sight range between the occupied station and the distant target under observation. In other embodiments the line-of-sight of the EDM may be arranged to be coaxial with that of the telescope.

The ranging instrument comprises a computer which normally processes the data derived from phase comparison components within that instrument and determines the appropriate values of the range digits for presentation to its own display panel. Through the data-communicating interface between the EDM instrument and the other components of the present system residing in the body of the surveying instrument, the ranging instrument supplies data to the system in the form of computed range digit values. It will be apparent, however, that other embodiments of the present system may be constructed which utilize the capabilities of the microcomputer comprising CPU 41 to derive such range values from phase comparison data provided by appropriate EDM instrument subassemblies.

Subsequent to range computation in the EDM instrument, digit value data are continually presented at gate 14 in a BCD parallel bit format along with a least significant digit identifier for use by the system program in properly justifying the digit display at means 32. Program enablement of gate 14 allows the range digit data to be accumulated in RAMs 44 for delivery to and presentation at display means 32, as earlier described. Such processing in the system, as shown in FIG. 4b, is effected in response to the setting of function switch 68 to the slope range demand position, R.

Figure 4A:
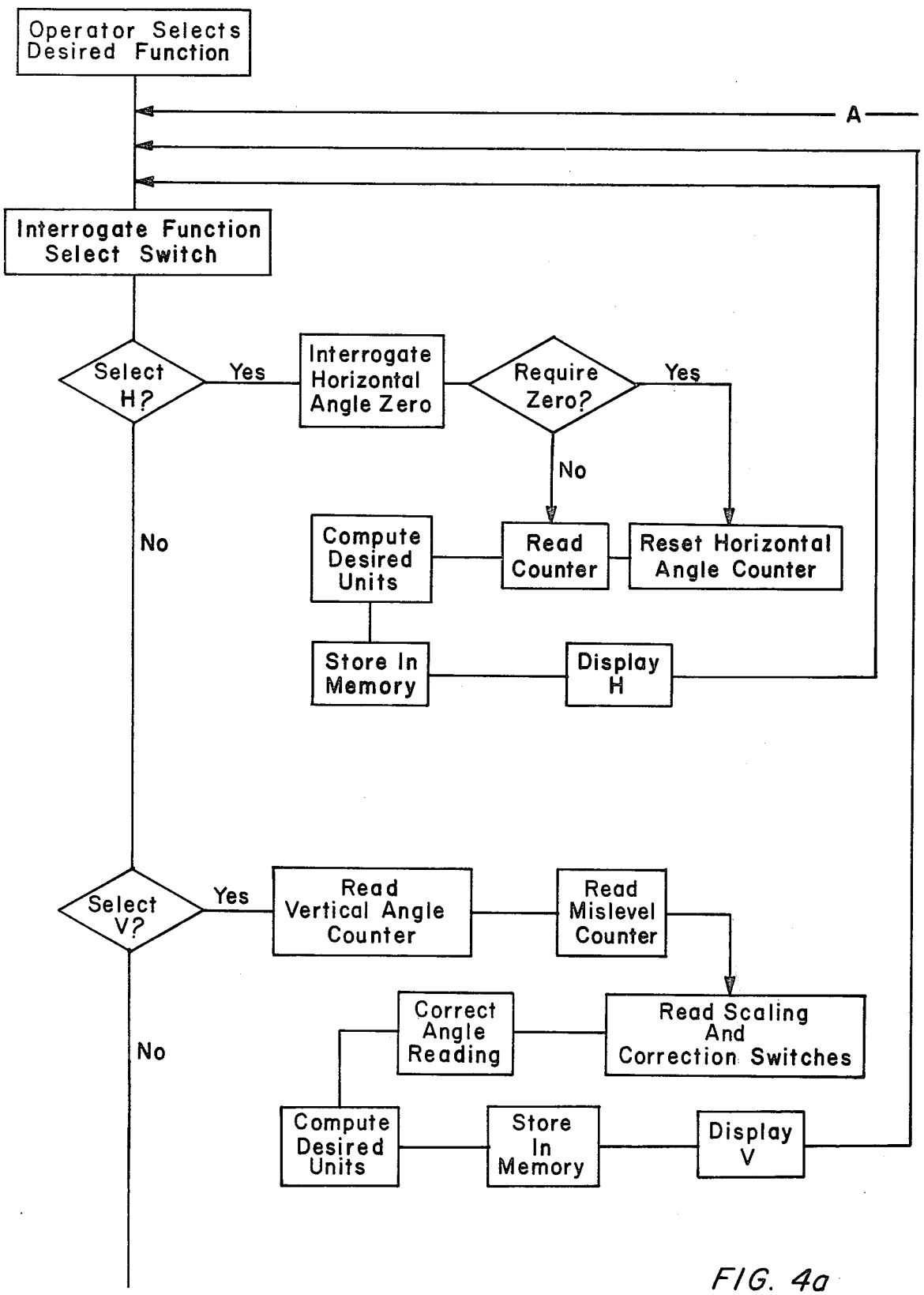
FIG. 4 (FIG. 4a–4c) is a diagram showing the flow of programming in the embodiment of FIG. 1.
Figure 4B:
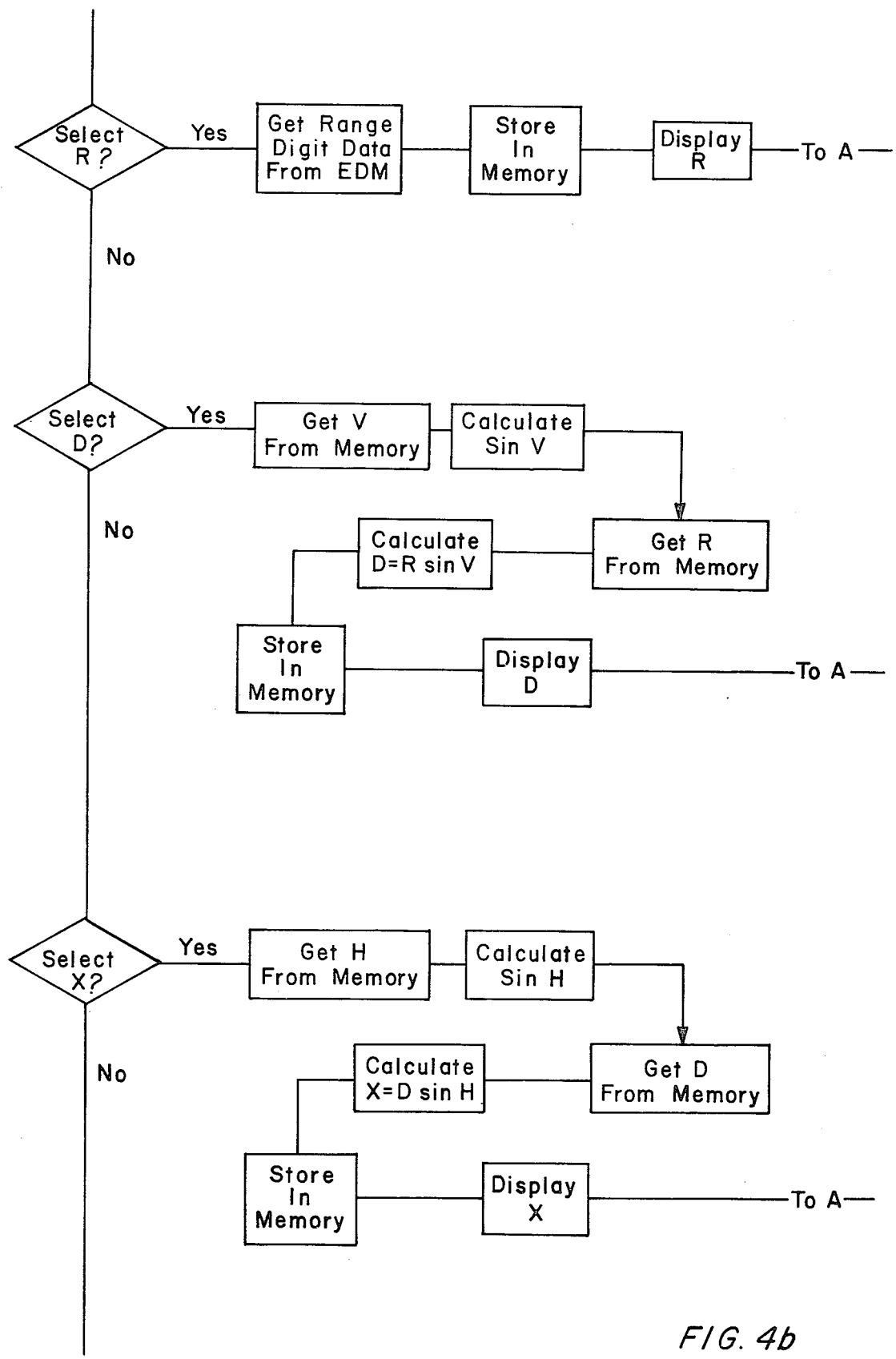

Selection of vertical angle, V, by the operator at function switch 68 initiates a routine sequence, as represented in the program flow diagram at FIG. 4a, which will ultimately provide a display of the declination of the observed target from the zenith, a format arrangement selected in view of the general practice in the surveying art. Since determination of vertical angle is consistently made with respect to a single datum, namely the zenith which in a properly leveled instrument is located on the axis of the vertical spindle of the alidade, an electro-optical counter reset index 63 is provided in the body of the theodolite in order to establish an initial zero datum for vertical angle counter 62 which will coincide precisely with the spindle axis. This index element is associated with the vertical circle of the theodolite alidade and is arranged to emit a signal pulse whenever the theodolite telescope passes through a predetermined line-of-sight attitude in order to zero the vertical angle counter 62 at that telescope position. In the present embodiment, the index is arranged to emit its initializing pulse whenever the line-of-sight passes through the plane of the gravity horizon at which instant counter 62 is "zeroed" to 100.00 grads in keeping with the selected units format. In this manner the accumulation of count loss data errors is virtually eliminated. A vertical angle indexing system utilized in the present embodiment of the invention is described in co-pending application of the assignee of this invention, Ser. No. 767,082, filed Feb. 9, 1977, now U.S. Pat. No. 4,097,734.

Since in the field there may be some deviation of the alidade spindle axis from a true vertical disposition, there is included in the body of the surveying instrument a level sensor 61 which provides digital data indicative of any such deviation. The preferred level device is one which incorporates a pendulously-mounted capacitive pickup sensor, such as described in co-pending application of the present assignee, Ser. No. 770,951, filed Feb. 22, 1977, now U.S. Pat. No. 4,077,132, which provides an indication of deviation from vertical over the range of about ± 0.6 grads. Since there may be distinctive variants in the component elements comprising individual level sensor devices, there is provided a scaling factor DIP switch, as at 69, by which a preset correction may be readily made with respect to each surveying instrument. Additionally, DIP switch provision is made for effecting the fine adjustment of the level sensor device with respect to the precise mechanical alignment of the gravity-referenced zero datum of the level sensor pendulum with the axis of the alidade spindle. Each of these correction and scaling values are read through access gates, as at 11, under the control of selector 22 at appropriate points in the computer routine for determining and displaying the vertical angle.

The sequence of procedures in that routine are initiated by the interrogation of function switch 68 which indicates the operator selection of parameter, V, requiring the determination and display of vertical angle. Digital data at vertical angle counter 62 is then accessed through gate 17 along bus lines 117 to bus 43 for storage in RAMs 44. Data is then gathered from level sensor 61, and preset scaling and level correction switches 69 for appropriate processing in calculator 67. The results of the computation are added to the properly scaled vertical count data and the appropriate unit conversion carried out in calculator 67. The final value is then deposited in RAMs 44 for later use, if needed, and the value of the vertical angle is sent on to display 32 in the manner previously described.

Horizontal distance, D, to the observed target may be selected by the operator by means of function switch 68 and is derived in that routine, shown in FIG. 4b, from the predetermined vertical angle and the calculation of the sine of the vertical angle by means of calculator 67. Range data are acquired and multiplied by the derived sine to determine the horizontal distance, D, for storage in RAMs 44 and display. Likewise, elevation, Z, is determined, as seen in FIG. 4c, from cos V and range data for RAM storage and display.

Figure 4C:
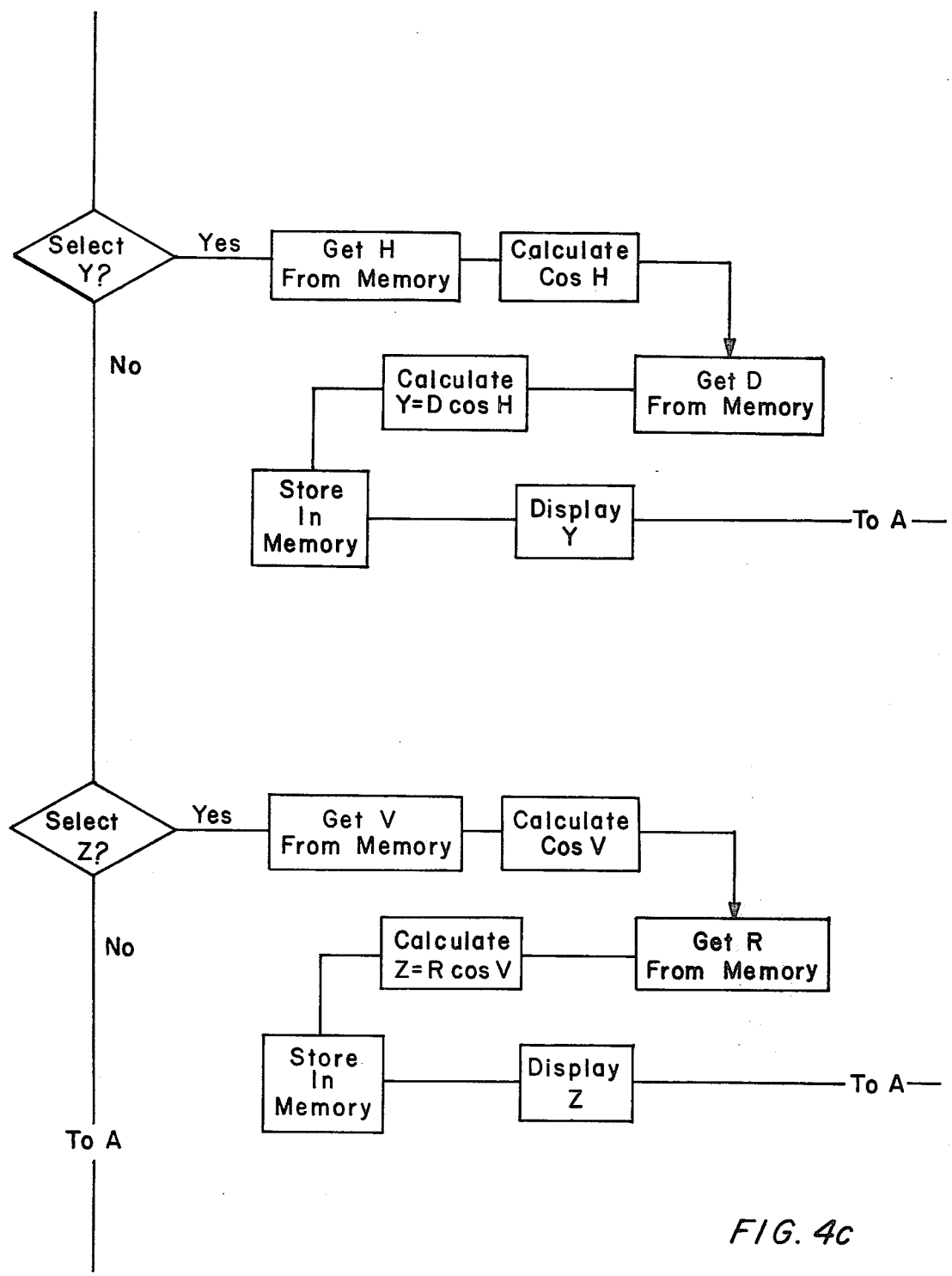

Latitude, Y, and departure X, vectors are in similar manner derived from previously calculated horizontal distance, D, and the respective cosine and sine of the measured horizontal angle according to the routines shown, respectively, in FIG. 4c and FIG. 4b.

What is claimed is:

1. A surveying system comprising:
   (a) a surveying instrument comprising an alidade and including electronic signal generating means associated with the respective horizontal and vertical circles of said alidade for providing data indicative of angular displacement of the line of sight in said alidade;
   (b) electronic distance measuring means associated with said surveying instrument for providing data indicative of the displacement along the line of sight between said surveying instrument and a target under observation; and
   (c) computing means interfaced with said surveying instrument and said measuring means for receiving and processing said displacement data to determine the values of the extent of said displacements and the vectors thereof.

2. A surveying system according to claim 1 which further comprises display means interfaced with said computing means for receiving data indicative of said displacement or vector values and displaying in digital form a selected one of said values.

3. A surveying system according to claim 2 which further comprises level sensing means for providing data indicative of the angular displacement of the spindle axis of said surveying instrument alidade from a vertical disposition, said computing means being interfaced with said level sensing means for receiving and processing said sensing means data to determine the value of the extent of said displacement from vertical.

4. A surveying system according to claim 3 wherein said display means comprises:
   (a) addressable read/write memory means interfaced with said computing means for receiving said value data, said data comprising a series of digit value bits and memory address bits;
   (b) means including gating means for communicating said address bits to said memory means;
   (c) means for independently duplicating said series of address bits and presenting said series to said gating means for communication to said memory means;
   (d) means for enabling the write mode of said memory means;
   (e) means acting substantially contemporaneously with said write enabling means for disabling said address duplicating means and enabling the communication of said selected value data from said computing means to said memory means, whereby said series of digit value bits is written in said memory means;
   (f) means for enabling the read mode of said memory means;
   (g) means acting substantially contemporaneously with said read enabling means for disabling said communication of value data from said computing means and enabling said address duplicating means, whereby said duplicate series of address bits is communicated to said memory means thereby effecting the output of said digit value bit series from said memory means;
   (h) digital presentation means;
   (i) digit formation decoding means communicating between said memory output and digital presentation means for generating the digits defined by said digit value bit series; and
   (j) digit selection decoding means communicating between said address duplicating means output and said digital presentation means for enabling the digits defined by said memory address bit series;
   (k) whereby the digital display of a selected one of said displacement or vector values is continuous and independent of computing means control but for those minor time intervals during which said computing means may be communicating value data to said display means.

* * * * *